United States Patent [19]

Richter

[11] 4,005,279
[45] Jan. 25, 1977

[54] LOCKABLE COVER FOR PUSH BUTTON TELEPHONES

[76] Inventor: Julian Richter, 8500 Biscayne Blvd., Miami, Fla. 33138

[22] Filed: May 24, 1976

[21] Appl. No.: 689,669

[52] U.S. Cl. .................................... 179/189 D
[51] Int. Cl.² .................................... H04M 1/66
[58] Field of Search ............ 179/189 R, 189 D, 179

[56] References Cited

UNITED STATES PATENTS

| | | | |
|---|---|---|---|
| 3,624,317 | 11/1971 | Buckingham et al. | 179/189 R |
| 3,881,071 | 4/1975 | Willis et al. | 179/179 |
| 3,899,647 | 8/1975 | Nachsi et al. | 179/189 D |

*Primary Examiner*—Thomas W. Brown
*Attorney, Agent, or Firm*—Salvatore G. Militana

[57] ABSTRACT

A lockable cover for push button telephones to prevent the unauthorized making of outgoing telephone calls consisting of a base member attachable to the underside of the telephone and a cover member having a raised portion to cover the push buttons of the telephone. The base member and cover members are pivotally secured together at the front edges thereof with tabs on the rear edges that have aligned openings for receiving a lock. When the lockable cover is in place on the telephone, the push buttons cannot be actuated to make unauthorized outgoing phone calls.

1 Claim, 4 Drawing Figures

U.S. Patent    Jan. 25, 1977    4,005,279
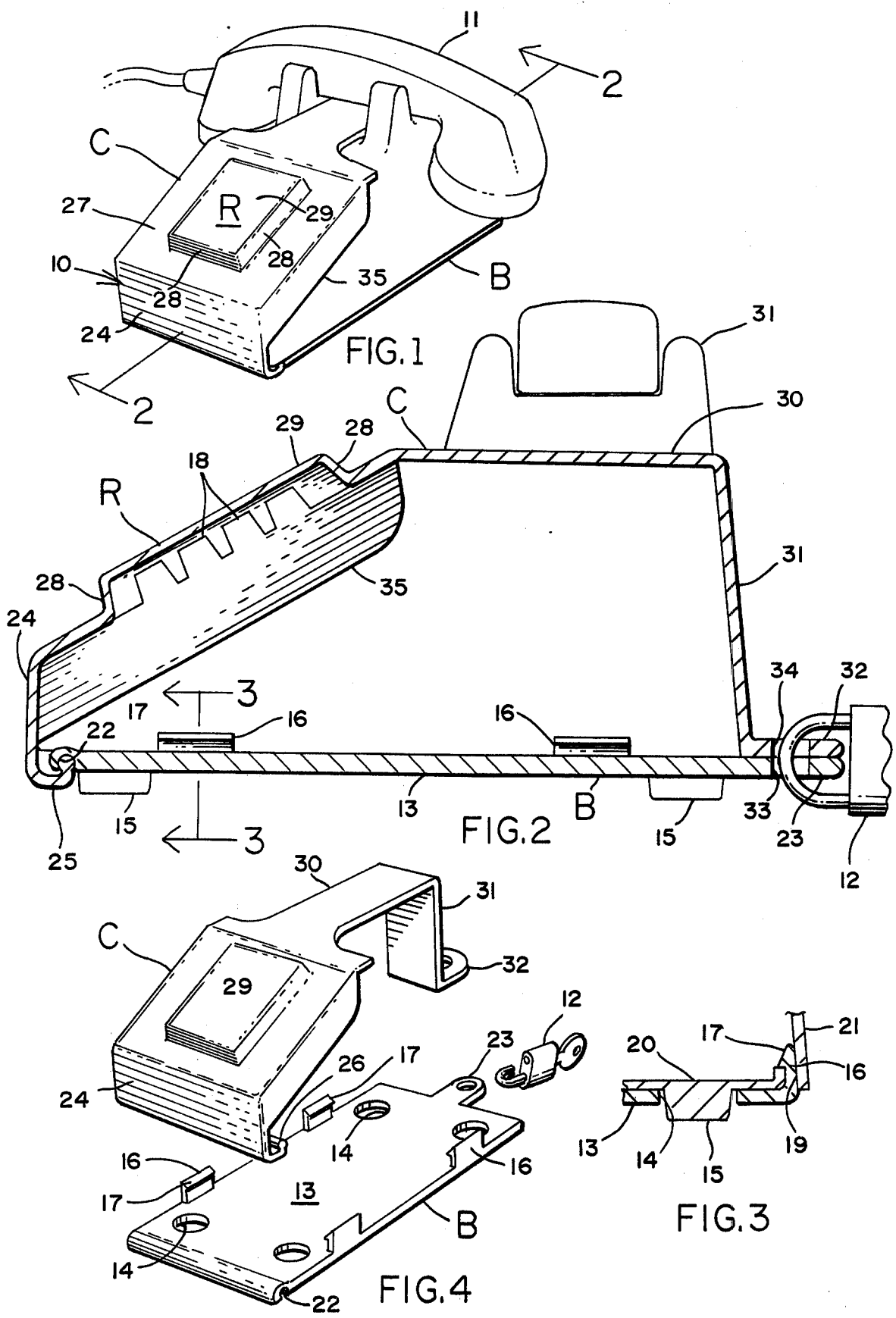

LOCKABLE COVER FOR PUSH BUTTON TELEPHONES

BACKGROUND OF THE INVENTION

1. Field Of The Invention

This invention relates to protection devices and is more particularly directed to a lockable cover for push button telephones.

2. Description Of The Prior Art

At the present time the lockable covers for push button telephones require that the conventional telephone case be removed and replaced by a specially designed case in order to lock the cover to the telephone or that special attachments be made to accommodate the cover to the telephone case. This, of course, is expensive in cost as well as requiring a skilled person to attach these devices to the telephone. The present invention contemplates avoiding these objections to the use of a lockable cover for push button telephones.

SUMMARY OF THE INVENTION

Therefore, a principal object of the present invention is to provide a lockable cover for push button telephones which is readily mounted on a telephone having the conventional telephone case to prevent the making of outgoing phone calls and which is readily removed from the telephone when authorized use of the telephone is desired.

Another object of the present invention is to provide a lockable cover device for push button telephones consisting of a base member that is removably attached to the base of the telephone and a cover member that enshrouds the push button and is pivoted to the cover at the front end and extending over the telephone to the rear end where the base member and cover members are locked together to prevent the actuation of the push buttons for making unauthorized outgoing phone calls.

A further object of the present invention is to provide a lockable cover for push button telephones which is simple in design and construction, inexpensive in cost and adapted to be used on all types of push button telephones.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

BRIEF DESCRIPTION OF THE DRAWING

In the drawing:

FIG. 1 is a perspective view of a telephone whose push buttons are prevented from being actuated by a lockable cover constructed and arranged in accordance with my invention.

FIG. 2 is a cross sectional view taken along the line 2—2 of FIG. 1, the telephone being shown in silhouette.

FIG. 3 is a fragmentary cross sectional view taken along the line 3—3 of FIG. 2.

FIG. 4 is an exploded view of my lockable cover.

DESCRIPTION OF THE PREFERRED EMBODIMENT

Referring to the drawing wherein like numerals are used to refer to similar parts throughout the several views, the numeral 10 refers to my lockable cover consisting of a base member B and a cover member C shown mounted about a conventional push button telephone 11 in a locked position by a lock 12.

The base member B which extends along a bottom wall of the telephone 11 consists of a substantially rectangular member 13 having openings 14 for the foot members 15 to extend therethrough. Along the two opposite side edges of the base member 13 are a pair of upstanding retaining members 16 at whose upper end portions are shoulder members 17. The retaining members 16 extend through the slot formed between the bottom wall 20 and rear wall 21 of the telephone 11. The shoulders 17 engage the bottom wall 20 to prevent the removal of the base member 13 from the telephone 11.

Along the forward edge portion of the base member 13 is an arcuate slot 22 extending the full width of the base member 13 with the bottom of the slot 22 extending through the lower surface of the base member 13. At the rear edge of the base member 13 is a tab 23 that extends outwardly therefrom with an opening 33 for receiving the lock 12.

Connected to the base member 13 as explained hereinafter and extending over the telephone 11 to cover the push buttons 18 is the cover member C consisting of a front wall 24. The front wall 24 that lies against and engages the front wall of the telephone 11 is provided with a foot portion 25 extending below the base member 13. Along the free edge of the foot portion 25 is an arcuate member 26 which is slidably mounted in the slot 19 to secure the cover member C to the base member B at their forward edge portions. The upper edge of the front wall 24 is connected to an inclined top wall 27 at whose mid-portion is a raised portion R for enshrouding the push buttons 18 consisting of upright side members 28 having a top wall 29 mounted thereon.

The top wall 27 is connected by a strap member 30 that extends along and between the cradle 31 of the telephone 11 and then downwardly as at 31 along the rear wall of the telephone 11 to the bottom wall 20. At the lower edge portion of the strap 31 is a tab 32 in mating position with the tab 23 of the base member 13. The tab 32 is provided with an opening 34 in alignment with the opening 33 of the tab 23 to secure the cover member C to the base member B by means of the lock 12 along the rear edge portion thereof. Along each side of the top wall 27 of the cover member C there is a flap portion 35 that extends downwardly along the side wall of the telephone 11 to prevent the insertion of a tool or the like between the top wall 27 of the cover member C and that of the telephone in order to operate the push buttons 18.

It would appear that except for dimensions, a lockable cover member 10 as shown and described hereinabove, can be used on all push button telephones. Consequently, any unauthorized use of push button type telephones in making outgoing telephone calls will be prevented by the use of my device 10.

All incoming telephone calls can be taken by merely lifting the receiver from the telephone cradle. However, if outgoing calls are to be made by use of the telephone 11, the lock 12 must first be unlocked and then removed from the tabs 32, 23, and the combined mouthpiece and receiver lifted from the cradle 31. The cover member C is then swung upwardly pivoting about the arcuate member 26 until clear of the telephone 11. Then the cover member C is slid sideways to slide the arcuate member 26 out of the slot 22. The telephone 11 now has its push buttons 18 in an exposed position to permit the making of outgoing phone calls. The base member B remains in position attached to the bottom wall 20 of the telephone 11 at all times. When it is desired to prevent access to the push buttons 18, the cover member C is returned to its aforesaid position on the telephone 11 and the tabs 23 and 32 locked together by the lock 12.

What I claim as new and desire to secure by Letters Patent is:

1. A lockable cover device for push button telephones comprising a base member, means adapted to removably secure said base member to the base of said telephone, a cover member adapted to be mounted over a front, top and rear walls of said telephone, said cover member having a raised portion for receiving and enshrouding the push buttons, means pivotally attaching said cover member to said base member along a front edge thereof, said pivotal means consisting of an open slotted portion having an arcuate cross sectional configuration along a cooperating edge of said cover member and an arcuate member of similar cross sectional shape on said front edge of said base member and slidably positioned in said slotted portion, said removable securing means having upstanding members mounted along sides of said base member adapted to be inserted between the base and side walls of said telephone and shoulder means mounted on the free ends of said upstanding members engaging the base wall of said telephone and tab portions mounted on a side opposite to said one side and locking means for securing said tabs together.

* * * * *